(12) United States Patent
Jin

(10) Patent No.: US 6,858,521 B2
(45) Date of Patent: Feb. 22, 2005

(54) METHOD FOR FABRICATING SPACED-APART NANOSTRUCTURES

(75) Inventor: Sungho Jin, San Diego, CA (US)

(73) Assignee: Samsung Electronics Co., Ltd., Gyeonggi-do (KR)

(*) Notice: Subject to any disclaimer, the term of this patent is extended or adjusted under 35 U.S.C. 154(b) by 11 days.

(21) Appl. No.: 10/357,004

(22) Filed: Feb. 3, 2003

(65) Prior Publication Data

US 2004/0127012 A1 Jul. 1, 2004

Related U.S. Application Data

(60) Provisional application No. 60/437,309, filed on Dec. 31, 2002.

(51) Int. Cl.$^7$ .............................................. H01L 21/38
(52) U.S. Cl. ...................................... 438/551; 313/310
(58) Field of Search .................... 438/551, 34; 313/310

(56) References Cited

U.S. PATENT DOCUMENTS

| | | | |
|---|---|---|---|
| 5,079,112 A | | 1/1992 | Berger et al. |
| 5,532,496 A | | 7/1996 | Gaston |
| 5,629,790 A | | 5/1997 | Neukermans et al. |
| 5,701,014 A | | 12/1997 | Berger et al. |
| 5,904,561 A | * | 5/1999 | Tseng ........................ 438/643 |
| 6,028,689 A | | 2/2000 | Michalicek et al. |
| 6,201,631 B1 | | 3/2001 | Greywall |
| 6,297,592 B1 | | 10/2001 | Goren et al. |
| 6,401,526 B1 | | 6/2002 | Dai et al. |
| 6,525,461 B1 | * | 2/2003 | Iwasaki et al. ............. 313/495 |
| 6,538,367 B1 | * | 3/2003 | Choi et al. .................. 313/309 |
| 6,653,228 B2 | * | 11/2003 | Choi et al. .................. 438/637 |
| 6,692,568 B2 | * | 2/2004 | Cuomo et al. ................. 117/84 |
| 2002/0158342 A1 | * | 10/2002 | Tuominen et al. .......... 257/784 |
| 2003/0034244 A1 | * | 2/2003 | Yasar et al. ............... 204/192.3 |
| 2003/0071246 A1 | * | 4/2003 | Grigorov et al. ........... 252/500 |
| 2003/0230753 A1 | * | 12/2003 | Steckl et al. .................. 257/89 |

OTHER PUBLICATIONS

Liu et al., Science, vol. 280, p. 1253 (1998).
Ren et al., Science, vol. 282, p. 1105 (1998).
Li et al., Science, vol. 274, p. 1701 (1996).
J. Trans et al., Nature, vol. 36, p. 474 (1997).
Fan et al., vol. 283, p. 512 (1999).
Bower et al., Applied Physics Letters, vol. 77, p. 830 (2000).
Applied Physics Letters, vol. 77, p. 2767 (2000).
Cheng et al., Chem. Physics Letters, vol. 289, p. 602 (1998).
Andrews et al., Chem. Physics Letters, vol. 303, p. 467 (1999).
O. Jessensky et al, Journal of Applied Physics, vol. 72, p. 1173, 1998.
A.P. Li et al, Journal of Applied Physics, vol. 84, p. 6023, 1998.
A.W. Scott, Understanding Microwaves, ch. 12, p. 282, John Wiley and Sons, Inc., 1993.
A.S. Gilmour, Jr., Microwave Tubes, Artech House, Norwood, MA, 1986.
C.A. Spindt, C.E. Holland, A. Rosengreen, and I. Brodie, "Field Emitter Array Development for High Frequency Operation," J. Vac. Sci, Technol. B, vol. 11, pp. 468–473, 1993.
W.B. Choi, et al, "Carbon–Nanotube Based Field–Emission Displays for Large Area and Color Applications", Journal of Information Display, vol. 1, No. 1, p. 59, Dec. 2000.

* cited by examiner

*Primary Examiner*—W. David Coleman
(74) *Attorney, Agent, or Firm*—Lowenstein Sandler PC

(57) ABSTRACT

In accordance with the invention, a spaced-apart array of nanostructures is fabricated by providing a shadow mask having a plurality of spaced apart, relatively large apertures, reducing the size of the apertures to nanoscale dimensions, and depositing a material through the mask to form a plurality of spaced-apart nanostructures. In a preferred embodiment, the spaced apart nanostructures comprise nanoscale islands (nano-islands) of catalyst material, and spaced-apart nanowires such as carbon nanotubes are subsequently grown from the islands.

25 Claims, 14 Drawing Sheets

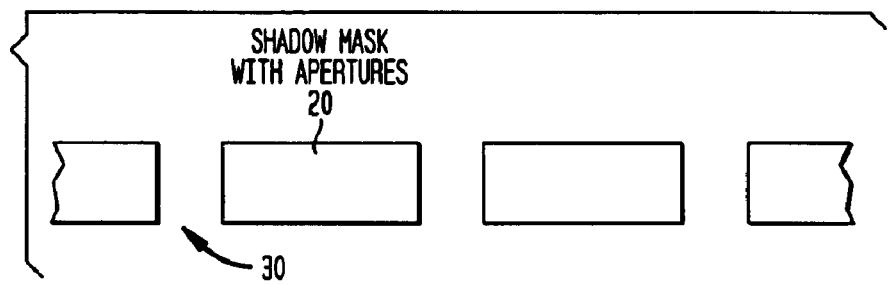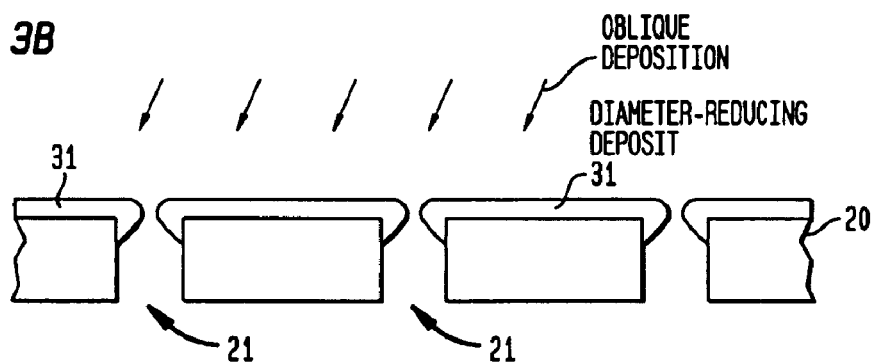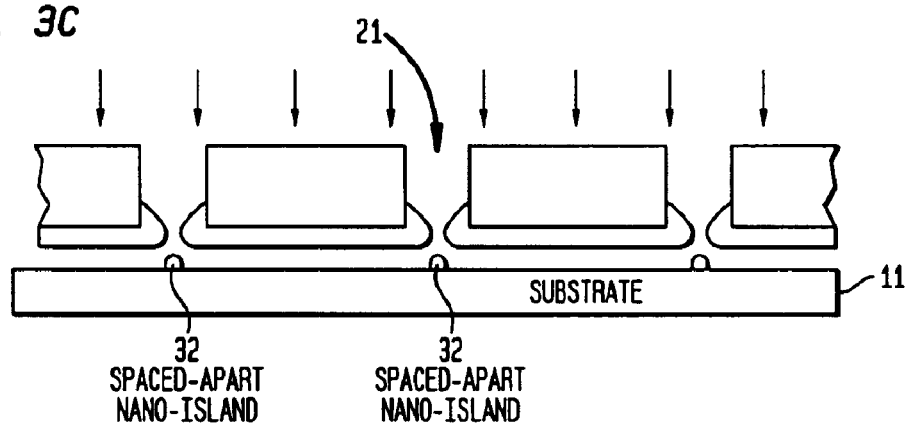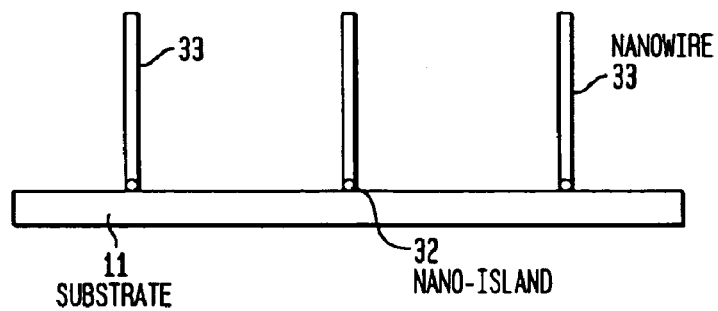

METHOD FOR FABRICATING SPACED-APART NANOSTRUCTURES

CROSS REFERENCE TO RELATED APPLICATIONS

This application claims the benefit of U.S. Provisional Application Ser. No. 60/437,309 filed Dec. 31, 2002 by Sungho Jin entitled "Article Comprising Spaced-Apart and Aligned Nanowires and Method For Making the Same", which is incorporated herein by reference.

This application is also related to U.S. application Ser. No. 10/357,004 filed by Sungho Jin concurrently herewith and entitled "Articles Comprising Spaced-Apart Nanostructures", which is incorporated herein by reference.

FIELD OF THE INVENTION

This invention relates to the fabrication of spaced-apart nanostructures and apparatus comprising such nanostructures.

BACKGROUND OF THE INVENTION

Fabrication of nanostructures, such as nano-islands and nanowires, is important for advanced electronic, magnetic and optical devices because of the unique characteristics of nanoscale structures. The term "nanostructure" as used herein refers to a structure having an extent of less than a micron in at least one of its three dimensions. The term "nanowire" is used generically to include both solid nanowires and hollow nanowires (nanotubes). The term "nano-island" refers to a substrate-supported structure having submicron dimensions in at least two and preferably all three dimensions. Small diameter nanowires, such as carbon nanotubes with diameters on the order of 1–100 nanometers, have received considerable attention in recent years. See Liu et al., *SCIENCE*, Vol. 280, p. 1253 (1998); Ren et al., *SCIENCE*, Vol. 282, p. 1105 (1998); Li et al., *SCIENCE*, Vol. 274, p. 1701 (1996); J. Tans et al., *NATURE*, Vol. 36, p. 474 (1997); Fan et al., *SCIENCE*, Vol. 283, p. 512 (1999); Bower et als., *Applied Physics Letters*, Vol. 77, p. 830 (2000), and *Applied Physics Letters*, Vol. 77, p. 2767 (2000).

Carbon nanotubes exhibit unique atomic arrangements, structures, and unusual physical properties such as one-dimensional electrical behavior, quantum conductance, and ballistic transport. Carbon nanotubes are one of the smallest dimensioned nanowire materials with generally high aspect ratio and small diameter, e.g., single-wall nanotubes may be made with diameters of ~1 nm and multi-wall nanotubes with diameters of less than ~50 nm.

High-quality single-walled carbon nanotubes are typically grown as randomly oriented, needle-like or spaghetti-like, tangled nanowires by laser ablation or arc techniques. Chemical vapor deposition (CVD) methods such as used by Ren et al., Fan et al., Li et al., and Bower et al. produce multiwall nanowires attached to a substrate, often with a semi-aligned or aligned, parallel growth perpendicular to the substrate. As described in these articles, catalytic decomposition of hydrocarbon-containing precursors such as ethylene, methane, or benzene produces carbon nanotubes when the reaction parameters such as temperature, time, precursor concentration, flow rate, are optimized. Nucleation layers such as thin coatings of Ni, Co, or Fe, are often intentionally added to the substrate surface to nucleate a multiplicity of isolated nanowires. Carbon nanotubes can also be nucleated and grown on a substrate without using a metal nucleating layer, e.g., by using a hydrocarbon-containing precursor mixed with a chemical component such as ferrocene, $(C_5H_5)_2Fe$ which contains one or more of these catalytic metal atoms. During the chemical vapor decomposition, these metal atoms serve to nucleate the nanotubes on the substrate surface. See Cheng et al., *CHEM. PHYSICS LETTERS*, Vol. 289, p. 602 (1998), and Andrews et al., *CHEM. PHYSICS LETTERS*, Vol. 303, p. 467 (1999).

Carbon nanotubes are useful for field emission devices such as flat panel field emission displays, microwave amplifiers, and electron beam lithography devices. Conventional field emission cathode materials typically have been made of metal (such as Mo) or semiconductor material (such as Si) with sharp tips of submicron size. However, the control voltage required for emission is relatively high (around 100 V) because of high work functions and insufficiently sharp tips. To significantly enhance local fields and reduce the voltage requirement for emission, it would be advantageous to provide nanoscale cathodes with small diameters and sharp tips.

In field emission devices, unaligned, randomly distributed nanowires are inefficient electron emitters due to the varying distance and hence varying local electric fields between the cathode (comprised of emitting nanowire tips) and the gate or the anode. In addition, when unaligned nanowires are used for emitters, an applied electric field between anode and cathode bends the nanowires along the field direction. The degree of bending is dependent on the applied voltage. This bending causes uncontrollable and undesirable changes in the distance between cathode and gate, and hence alters the local field on different nanowires. In some cases, the bending causes outright electrical shorting between the nanowire tips and the gate. Nanowires pre-aligned toward the anode could prevent or reduce the bending problem.

Referring to the drawings, FIGS. 1(a) and 1(b) (which are conventional) schematically illustrate configurations of aligned nanotubes 10 grown on a substrate 11 in a dense "forest-like" configuration (FIG. 1(a)) or in spaced-apart "forests" (FIG. 1(b)). The present invention is directed to a method of making more desirable configurations of more widely spaced apart individual nanostructures (FIG. 1(c)) or spaced apart small groups of nanostructures (FIG. 1(d)). A forest configuration wastes the unique, high-aspect-ratio, field concentrating characteristics of individual nanostructures such as nanowires. While the alignment of nanowires is important for many applications, highly oriented nanowires do not alone guarantee efficient field emission. The reason is that the individual nanowires are so closely spaced that they shield each other from effective field concentration at the ends. It is therefore desirable to establish a processing methodology which will create the desirable spaced apart, configurations of nanostructures such as are schematically illustrated in FIGS. 1(c) and 1(d).

SUMMARY OF THE INVENTION

In accordance with the invention, a spaced-apart array of nanostructures is fabricated by providing a shadow mask having a plurality of spaced apart, relatively large apertures, reducing the size of the apertures to nanoscale dimensions, and depositing a material through the mask to form a plurality of spaced-apart nanostructures. In a preferred embodiment, the spaced apart nanostructures comprise nanoscale islands (nano-islands) of catalyst material, and spaced-apart nanowires such as carbon nanotubes are subsequently grown from the islands.

BRIEF DESCRIPTION OF THE DRAWINGS

The nature, advantages and various additional features of the invention will appear more fully upon consideration of the illustrative embodiments now to be described in detail in connection with the accompanying drawings. In the drawings:

FIGS. 1(a) and 1(b) are conventional;

FIGS. 3(a)–(d) schematically illustrate (a) a standard shadow mask fabricated by known techniques, (b) an exemplary inventive process of fabricating a shadow mask with spaced-apart and reduced-diameter aperture array, (c) an exemplary use of such a reduced-diameter apertures for creating spaced-apart nano-islands, and (d) the use of nano-islands so obtained for subsequent growth of spaced-apart nanowires;

It is to be understood that these drawings are for the purposes of illustrating the concepts of the invention and are not to scale.

DETAILED DESCRIPTION OF THE INVENTION

In accordance with the invention, a spaced-apart array of nanostructures is fabricated by providing a shadow mask having a plurality of spaced apart apertures, reducing the size of the apertures to nanoscale dimensions, and depositing a material through the mask to form a plurality of spaced-apart nanostructures. In a preferred embodiment, the spaced apart nanostructures comprise nanoscale islands. The islands can be composed of catalyst material, and spaced-apart nanowires such as carbon nanotubes can be grown from the islands.

Figure 2:
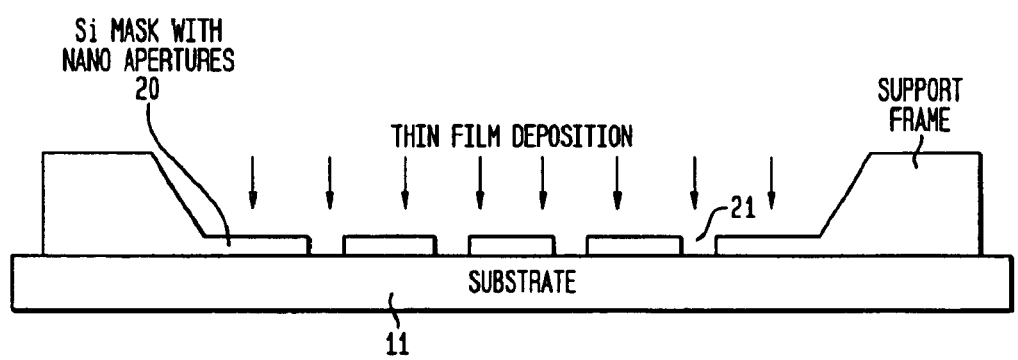
FIG. 2 shows forming spaced-apart nanostructures, such as nucleation sites for nanowire growth, by employing a shadow mask containing a nanoscale aperture array.

FIG. 2 illustrates the basic process. A shadow mask 20 having nanoscale apertures 21 is disposed on a substrate 22. Material is then deposited through the shadow mask 20 onto the substrate 11 to form an array of nanoscale structures (not shown).

FIGS. 3(a)–3(d) illustrate the formation of the nanoapertured shadow mask. The first step is to provide a coarse-patterned shadow mask, such as illustrated in FIG. 3(a). The coarse-patterned mask can be formed, for example, by standard photolithography, on a silicon substrate. The coarse-pattern can comprise, for example, an array of 1 micrometer diameter vertical holes spaced by 2 micrometer separation. An alternative way of providing relatively inexpensive, coarse-patterned substrate is to provide porous anodic aluminum oxide membranes containing vertical and spaced-apart apertures. Membranes can be provided with 300 nm diameter apertures spaced 900 nm apart (center-to-center). Such membranes are described by O. Jessensky et al, in the *Journal of Applied Physics*, Vol. 72, page 1173, 1998, and by A. P. Li et al, in the *Journal of Applied Physics*, Vol.84, page 6023, 1998. These anodic aluminum oxide membranes are commercially available and inexpensive.

The second step is to reduce the diameter of the apertures in the mask. This can be accomplished, as shown in FIG. 3(b), by depositing material 31 as by physical vapor deposition, chemical vapor deposition, or electrochemical deposition. Sufficient material is added around the openings to reduce the effective diameter of the openings to one-third the effective diameter before the material was added or less to one-fifth the diameter before the material was added or less. For example, a metal or alloy (such as Ni, Cu, Mo and alloys) or a ceramic material (such as silicon oxide, titanium oxide, silicon nitride) is DC or RF sputter deposited or evaporated to partially plug up the apertures in the coarse-patterned mask so that the smallest diameter portion is less than 200 nm, preferably less than 100 nm, even more preferably less than 30 nm. As shows in FIG. 3(b), the deposition is carried out preferably (but not neccesarily) at an oblique direction with either a rotating substrate or a rotating sputtering/evaporator source for the efficiency of diameter-reduction and for maximizing the light-of-sight coverage especially for evaporation. The desired angle of oblique incident deposition is typically in the range of 2–70 degree of the vertical axis and preferably 5–45 degrees.

An alternative way of reducing the size of apertures in the coarse-patterned shadow mask is electrodeposition such as electroplating or electroless plating. For example, metals such as nickel or cobalt can be electroplated onto the apertured silicon wafer (preferably doped silicon for required conductivity for electrodeposition to occur) until the aperture diameter is reduced to the desired level.

Another alternative way of reducing the aperture diameter is chemical vapor deposition of metal, silicon or silicon oxide. Yet another alternative is thermal oxidation of the mask material such as growing silicon oxide on a silicon shadow mask surface.

As the third step, the completed shadow mask with reduced aperture diameter is used as a shadow mask for deposition of nano-islands 32 on a substrate 11 as illustrated schematically in FIG. 3(c). The islands can be catalyst metal deposited through the nano-apertured shadow mask to form an array of nano-islands which are desirably spaced-apart owing to the spacing between spacing between apertures of the mask.

The nano-islands 32 can be useful for a number of applications, such as quantum dot devices. As shown in FIG. 3(d), they can also be useful as nucleating sites for nanowires 33, especially nanowires with sub-100 nm diameter, preferably in the range of 1–30 nm. The nanowires can be carbon nanotubes, Si, Ge, GaN, GaAs, ZnO, or other types of metal or ceramic nanowires such as carbides, nitrides, borides, or oxides. The nanowires can be metallic, insulating or semiconducting in nature. Electrically insulating nanowires may be additionally coated with conductive materials such as a thin layer of metal if electrical conduction is desired. The nanowires can be simple homogeneous wires or co-axially composite nanowires with different composition materials in cylindrical layers. They can be vertically superlatticed, stacked materials with alternating or sequentially varying compositions.

A further improved method involves selection of a ferromagnetic metal or alloy as the material to reduce the aperture diameter. Exemplary ferromagnetic materials include Fe, Ni, Co, Ni—Fe, Co—Fe, Nd—Fe—B, Sm—Co. The ferromagnetic material can be deposited by sputtering, evaporation, electrodeposition or CVD processing. With the ferromagnetic material deposited, the shadow mask can be magnetically transported to the substrate and magnetically held in position during deposition through the mask.

Figure 4A:
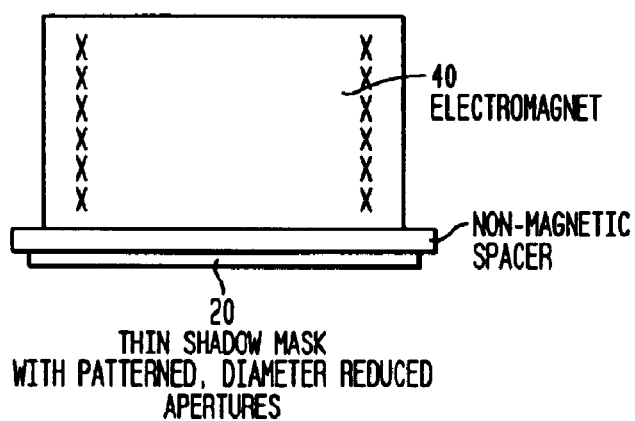
FIG. 4 shows an advantageous process for reliably obtaining periodically spaced-apart nucleation sites for nanowire growth by (a) employing magnetic transport and (b) by employing magnetic holding of the reduced-diameter shadow mask during nano-island deposition.

Shadow masks with small aperture diameters are desirably thin. Hence they are generally fragile and prone to breakage unless carefully handled. As illustrated in FIG. 4(a), magnetic transport, placement and removal (after deposition) reduces mask breakage. In the magnetic transport, an electromagnet 40 is slowly magnetized by sending an electrical current to its solenoid, thus gently picking up the ferromagnetic shadow mask. Slow demagnetization after the transportation to the desired location gently releases the mask from the transporting electromagnet.

Figure 4B:
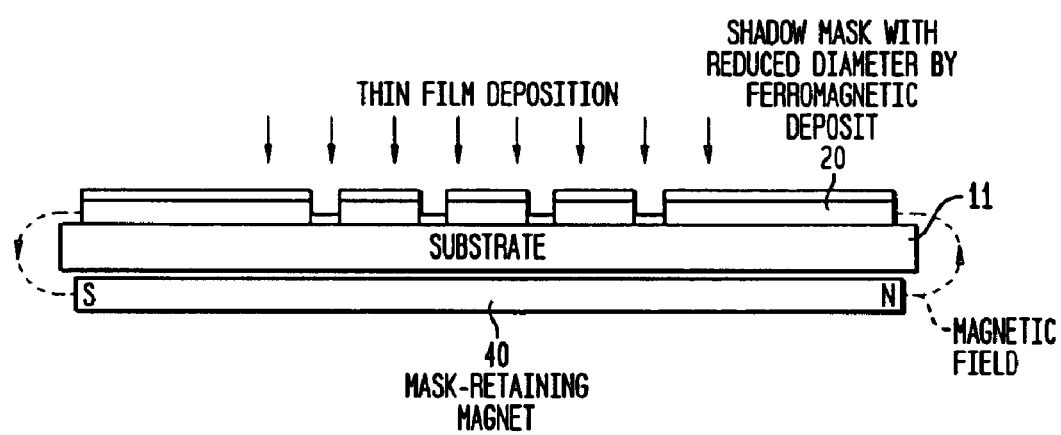

Magnetic holding of the mask in place is illustrated in FIG. 4(b). This holding essentially eliminates the possibility of an unwanted shift of the fragile, light-weight mask during catalyst deposition. An additional benefit of magnetic holding is reduction of unwanted local gaps between the mask and the substrate. The holding prevents undesirable disruption of the nano pattern such as a spread of the deposited dot area where the mask-substrate gap is higher. For magnetic holding of the diameter-reduced shadow mask on the substrate surface, the activation of the mask-retaining magnet needs to be gentle. This can be done either by slow magnetization of an electromagnet or by moving a permanent magnet slowly toward the bottom of the substrate. The magnetic field desirably forces the ferromagnetic mask membrane tightly onto the substrate surface and locks it in place.

Figure 5A:
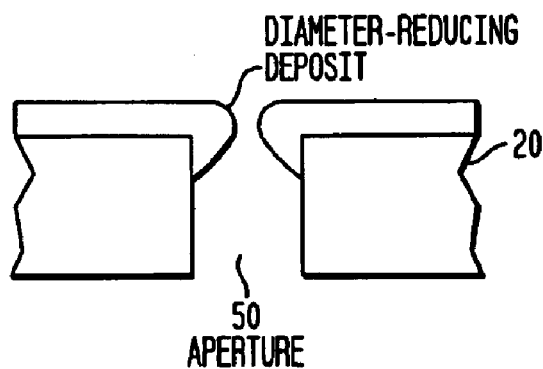
FIG. 5 schematically illustrates exemplary configurations of reduced-diameter apertures.
Figure 5B:
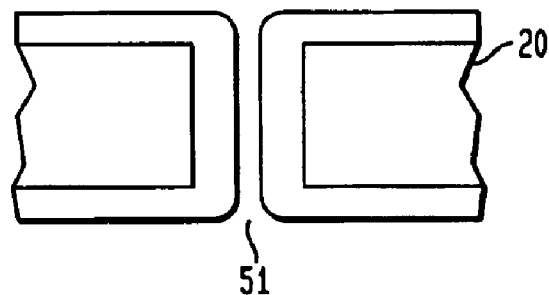
Figure 5C:
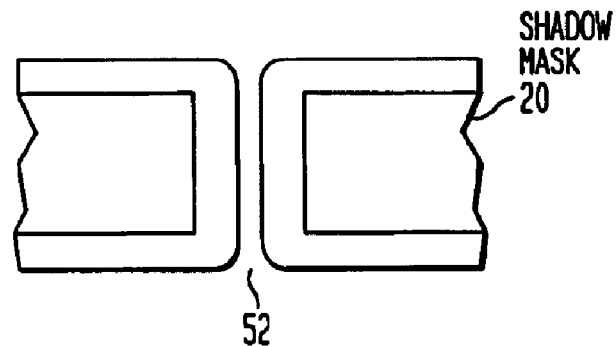

The shadow masks with reduced aperture diameter can have a variety of shapes of the vertical pores depending on the diameter-reducing process employed. Sputtering, evaporation, CVD or electrodeposition carried out on one side of the shadow mask generally produce gradient-diameter holes 50 as shown in FIG. 5(a). During electrodeposition or CVD deposition, one side of the mask can easily be blocked from the deposition by either placing a blanking plate, or adding a removable masking material such as a solvent- or water-soluble polymer which can be removed later to make the holes available for catalyst deposition. If the diameter-reducing operation is carried out on both surfaces of the mask, the hole configuration 51 can be that shown in FIG. 5(b) or 5(c) depending on the aspect ratio of the starting, coarse-patterned apertures, the nature and speed of deposition, as well as the accessability of gases or electrolytes to the middle depth of the aperture.

Upon repeated use of the shadow mask for nano-island deposition, the apertures will eventually become smaller or even become completely blocked with accumulated deposition materials. For carbon nanotube growth, the nano-island thickness can be very thin, e.g. 1–5 nm, so the shadow mask aperture, e.g., 30 nm diameter, can last for many deposition runs. To minimize hole-blocking and prolong the life of the shadow mask, the diameter-reducing deposit material should have a low sticking coeffecient for the nano-island deposition material. Alternatively, a thin coating of low sticking coeffecient material (such as Teflon) may be added as a finishing coating on the diameter-reduced shadow mask. Yet another technique is to periodically etch the shadow mask after certain number of runs to reopen the aperture and to the originally-intended nanoaperture diameter. This can be accomplished by plasma etching, chemical etching, or electrochemical etching. If the diameter-reducing deposit material is selected to be etch-resistant, for example, $SiO_2$, Cr or Au, a dilute acid etching will etch away only accumulated catalyst metal (such as Fe, Ni or Co) without attacking the diameter-reducing deposit material.

While the process has been is described as reducing the "diameter" of apertures, similar principles can be used to reduce the size of non-circular openings into nanoscale dimensions. For non-circular openings the "diameter" refers to the effective diameter, i.e. the diameter of a circle of comparable area.

Figure 6A:
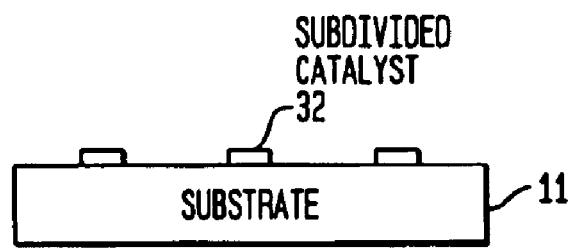
FIG. 6 shows an advantageous periodically spaced-apart, aligned carbon nanotube structure.
Figure 6B:
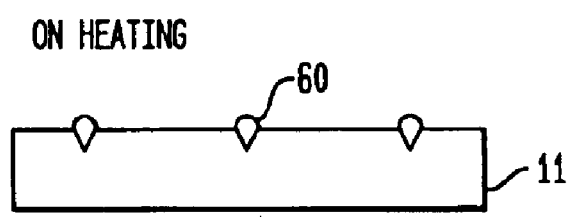
Figure 6C:
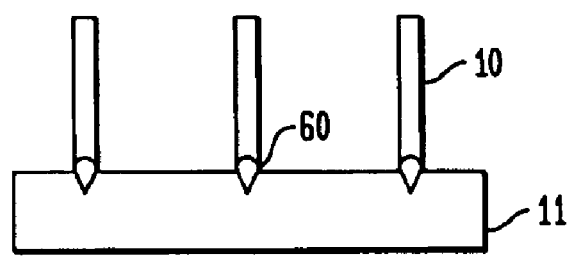

As shown in FIG. 6, a nano-island array generated by the inventive process is useful for creating a nanowire array. The deposition of nanowires such as carbon nanotubes can be accomplished by chemical vapor deposition using a hydrocarbon containing gas such methane, ethylene or acethylene. Thermal CVD, microwave plasma-enhanced CVD, hot filament CVD may be utilized. For example, the CVD growth of carbon nanotubes is optimized e.g., by a microwave plasma-enhanced CVD process using a 2.45 GHz, 5 KW microwave power supply and an inductively heated substrate stage. Acetylene ($C_2H_2$) or other suitable hydrocarbon gas will be used as a base source of carbon in the CVD chamber, together with ammonia ($NH_3$) or hydrogen gas. The vertical alignment of nanotubes in a microwave environment is achieved by the presence of an AC microwave field perpendicular to the substrate surface as described in Bower et al. Metallic nanowires can also be generated from the nano-islands by electrodeposition. The introduction of spaced-apart nano catalyst islands 32 produces nanowires 10 (such as carbon nanotubes) with much smaller diameter and further spaced configuration than an unpatterned or coarse-patterned catalyst. The catalyst islands 32 become essentially spheroidized during heating to the CVD temperature to form particles 60. These particles react with a silicon substrate, form silicide roots for adhesion to the substrate and become nucleation sites for the growth of nanowires 10.

Figure 7A:
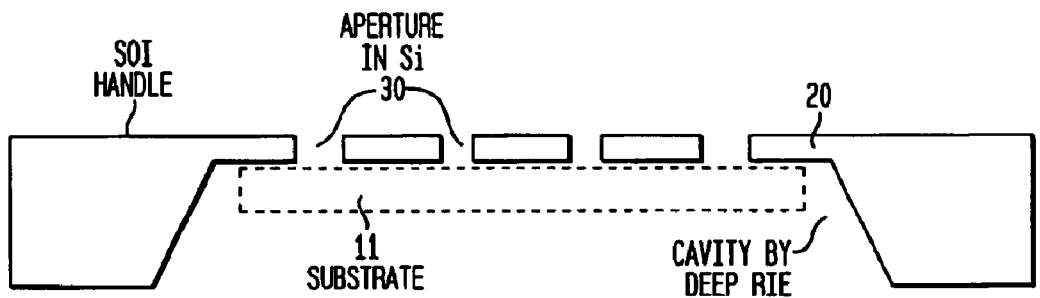
FIGS. 7(a) and (b) illustrate exemplary shadow masks useful for fabricating reduced-diameter-apertured shadow masks.
Figure 7B:
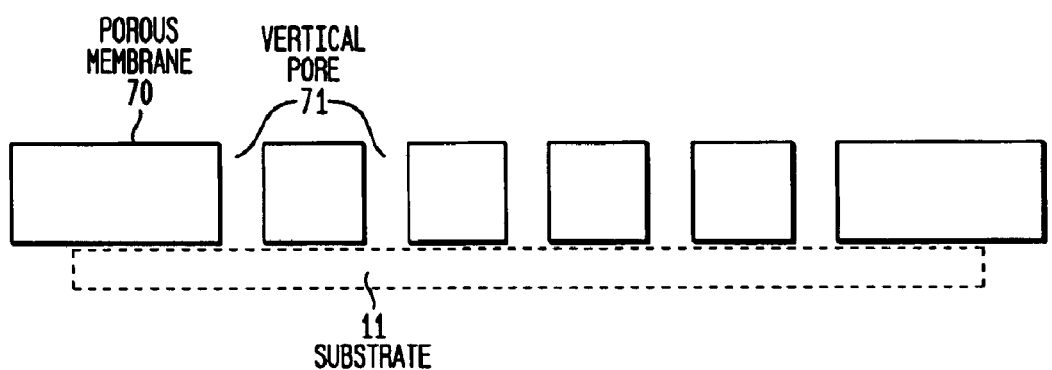

The coarse-scale shadow masks can be easily fabricated using standard silicon wafer photolithography. The mask feature size can be as coarse as ~500 nm diameter for the coarse aperture 30 (FIG. 7(a)). Alternatively, anodized aluminum oxide membranes 70 with hexagonally arranged vertical holes 71 with a diameter of 300 nm or smaller, are commercially available.

Figure 1A:
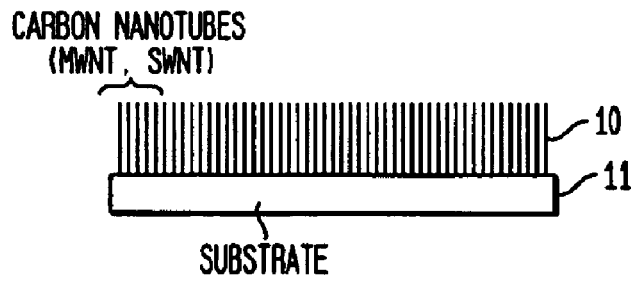
FIG. 1(a)–(d) schematically illustrate various configurations of vertically aligned nanowire structure
Figure 1B:
Figure 1C:
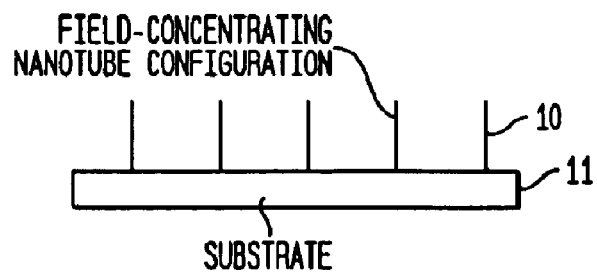
Figure 1D:
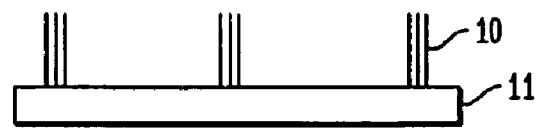

Spaced-apart and aligned nanowires can be periodically placed in a square or hexagonal arrangement or can be arranged randomly depending on the pattern shape in the shadow mask. In general, a periodic arrangement is preferred for simplicity and predictability of nanowire behavior. The desired space between neighboring, vertically aligned nanowires in FIG. 1(c) type configuration is such that the nanowire spacing to the nanowire height ratio is at least 0.2, preferably at least 0.5, even more preferably at least 1.0. The desired nanowire or nanotube diameter is typically in the range of 1–500 nm, preferably in the range of 1–50 nm. The desired nanowire height is in the range of 0.1–200 microns, preferably 0.5–50 microns, with an aspect ratio (length-to-diameter ratio) typically in the range of 10–10000.

The array of periodic and spaced-apart aligned nanowires may advantageously be utilized for various device or processing tool applications. For example, such desirably configured nanowires with significantly enhanced field concentrating capability can be utilized as an improved field emission cathode for a microwave amplifier device for field emission based, flat-panel displays or as a plasma based flat-panel display. Such a nanowire array can also be useful as a powerful electron source for nano fabrication, such as electron beam lithography, especially if the source is provided with the capability to steer the electron beam. The inventive structure can also improve high-resolution displays based on steerable electron sources and to provide a high-resolution x-ray source array.

These devices and applications are described in greater details as follows.

Microwave Amplifiers

Carbon nanotubes are attractive as field emitters because their unique high aspect ratio (>1,000), one-dimensional structure and their small tip radii of curvature (~10 nm) tend to effectively concentrate the electric field. In addition, the atomic arrangement in a nanotube structure imparts superior mechanical strength and chemical stability, both of which make nanotube field emitters robust and stable, especially for high current applications such as microwave amplifier tubes. Microwave amplifier tubes are essential components of many modern microwave systems including telecommunications, radar, electronic warfare and navigation systems. While semiconductor microwave amplifiers are available, they generally lack the power capabilities required by most microwave systems. Microwave vacuum tube amplifiers, in contrast, can provide higher microwave power by orders of magnitude. The higher power levels of vacuum tube devices are the result of the fact that electron can travel orders of magnitude faster in a vacuum with much less energy losses than they can travel in a solid semiconductor material. The higher speed of electrons permits the use of the larger structure with the same transit time. A larger structure, in turn, permits a greater power output, often required for efficient operations.

Microwave tube devices typically operate by introducing a beam of electrons into a region where it will interact with an input signal and deriving an output signal from the thus-modulated beam. See A. W. Scott, *Understanding Microwaves*, Ch 12, page 282, John Wiley and Sons, Inc., 1993, and A. S. Gilmour, Jr., *Microwave Tubes*, Artech House, Norwood, Mass., 1986. Microwave tube devices include gridded tubes, klystrons, traveling wave tubes or crossed-field amplifiers and gyrotrons. All of these require a source of emitted electrons.

Traditional thermionic emission cathode, e.g., tungsten cathodes, may be coated with barium or barium oxide, or mixed with thorium oxide, are heated to a temperature around 1000° C. to produce a sufficient thermionic electron emission current on the order of amperes per square centimeter. The necessity of heating thermionic cathodes to such high temperatures causes a number of problems: it limits their lifetime, introduces warm-up delays and requires bulky auxilliary equipment. Limited lifetime is a consequence of the high operating temperature that causes key constituents of the cathode, such as barium or barium oxide, to evaporate from the hot surface. When the barium is depleted, the cathode (and hence the tube) can no longer function. Many thermionic vacuum tubes, for example, have operating lives of less than a year. The second disadvantage is the delay in emission from the thermionic cathodes due to the time required for temperature ramp-up. Delays up to 4 minutes have been experienced, even after the cathode reaches its desired temperature. This length of delays is unacceptable in fast-warm-up applications such as some military sensing and commanding devices. The third disadvantage is that the high temperature operation requires a peripheral cooling system such as a fan, increasing the overall size of the device or the system in which it is deployed. The fourth disadvantage is that the high temperature environment near the grid electrode is such that the thermally induced geometrical/dimensional instability (e.g., due to the thermal expansion mismatch or structural sagging and resultant cathode-grid gap change) does not allow a convenient and direct modulation of signals by the grid voltage alterations. These problems can be resolved or minimized if a reliable cold cathode can be incorporated. Accordingly, there is a need for an improved cold-cathode based electron source for microwave tube devices which does not require high temperature heating. Such cold cathode type microwave amplifier device was disclosed by Goren, et al. in U.S. Pat. No. 6,297,592, "Microwave vacuum tube device employing grid-modulated cold cathode source having nanotube emitters", issued on Oct. 2, 2001. Sources using these carbon nanotubes provide electrons for microwave vacuum tubes at low voltage, low operating temperature and with fast-turn-on characteristics.

Figure 8:
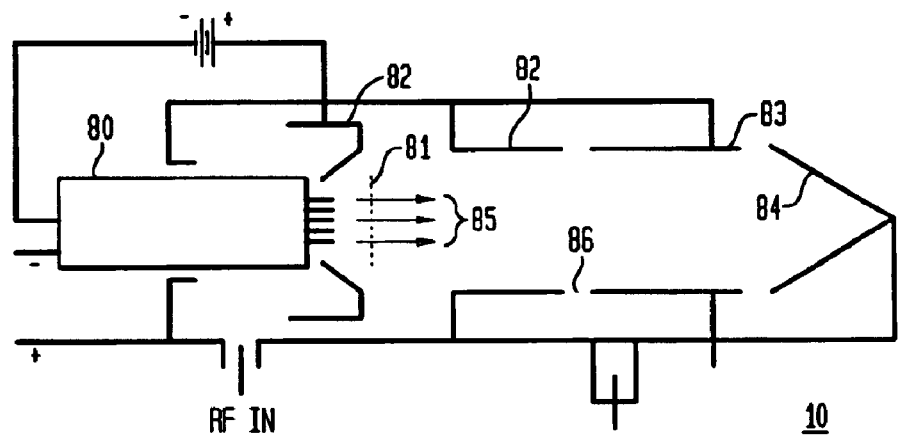
FIG. 8 shows an improved microwave amplifier.

Referring to the drawings, FIG. 8 is a schematic cross-sectional illustration of an exemplary inventive microwave vacuum tube comprising spaced-apart nanowire cold cathode, which is basically of "klystrode" type. The klystrode structure is of gridded tube type (other types of gridded tubes include triodes and tetrodes). The inventive device contains 5 main elements—a cathode 80, a grid 81, an anode 82, a tail pipe 83, and a collector 84. The whole tube is optionally placed in a uniform magnetic field for beam control. In operation, a RF voltage is applied between the cathode 80 and grid 81 by one of several possible circuit arrangements. For example, it is possible for the cathode to be capacitively coupled to the grid or inductively coupled with a coupling loop into an RF cavity containing the grid structure. The grid 81 regulates the potential profile in the region adjacent the cathode, and is thereby able to control the emission from the cathode.

The resulting density-modulated (bunched) electron beam 85 is accelerated toward the apertured anode 82 at a high potential. The beam 85 passes by a gap 86, called the output gap, in the resonant RF cavity and induces an oscillating voltage and current in the cavity. RF power is coupled from the cavity by an appropriate technique, such as inserting a coupling loop into the RF field within the cavity. Finally, most of the beam passes through the tail pipe 83 into the collector 84. By depressing the potential of the collector 84, some of the dc beam power can be recovered to enhance the efficiency of the device.

The inventive, improved klystrode structure is a very efficient device because it combines the advantages of the resonant circuit technologies of the high frequency, velocity-modulated microwave tubes (such as klystrons, traveling wave tubes and crossed-field tubes) and those of the grid-modulation technologies of triodes and tetrodes, together with the unique, cold cathode operation using high-current emission capabilities of nanowire field emitters. The inventive cold cathode allows the grid to be positioned very close to the cathode, for direct modulation of the electron beam signals with substantially reduced transit time.

Since efficient electron emission is typically achieved by the presence of a gate electrode in close proximity to the cathode (placed about 1–100 µm distance away), it is desirable to have a fine-scale, micron-sized gate structure with as many gate apertures as possible for maximum emission efficiency and minimize the heating effect caused by electrons intercepted by the gate grids. The grid in the inventive, cold cathode type, vacuum tube device is made of conductive metals, and has a perforated, mesh-screen or apertured structure so as to draw the emitted electrons yet let the electrons pass through through the apertures and move on to the anode. The apertured grid structure can be prepared by photolithographic or other known patterning technique, as is commercially available. The desired average size of the aperture is in the range of 0.5–500 µm, preferably 1–100 µm, even more preferably 1–20 µm. The grid structure in the present invention can also be in the form of a fine wire mesh screen, typically with a wire diameter of 5–50 µm and wire-to-wire spacing (or aperture size) of 10–500 µm. The aperture shape can be either circular, square or irregular.

Within each aperture area, a multiplicity of optimally spaced-apart nanotube emitters attached on the cathode surface emit electrons when a field is applied between the cathode and the grid. A more positive voltage is applied to the anode in order to accelerate and impart a relatively high energy to the emitted electrons. The grid is a conductive element placed between the electron emitting cathode and the anode. It is separated from the cathode but is kept sufficiently close in order to induce the emission.

The grid can be separated from the cathode either in a suspended configuration or with an electrically insulating spacer layer such as aluminum oxide. The dimensional stability of the grid, especially the gap distance between the cathode and the grid, is important, for example, in the case of unavoidable temperature rise caused by electron bombardment on the grid and resultant change in dimension and sometimes geometrical distortion. It is desirable that the grid be made with a mechanically strong, high melting point, low thermal expansion metal such as a refractory or transition metal. The use of mechanical strong and creep-resistant ceramic materials such as highly conductive oxides, nitrides, or carbides is also possible. The grid is desirably configured to have as much mechanical rigidity as possible.

Field Emission Displays

Figure 9:
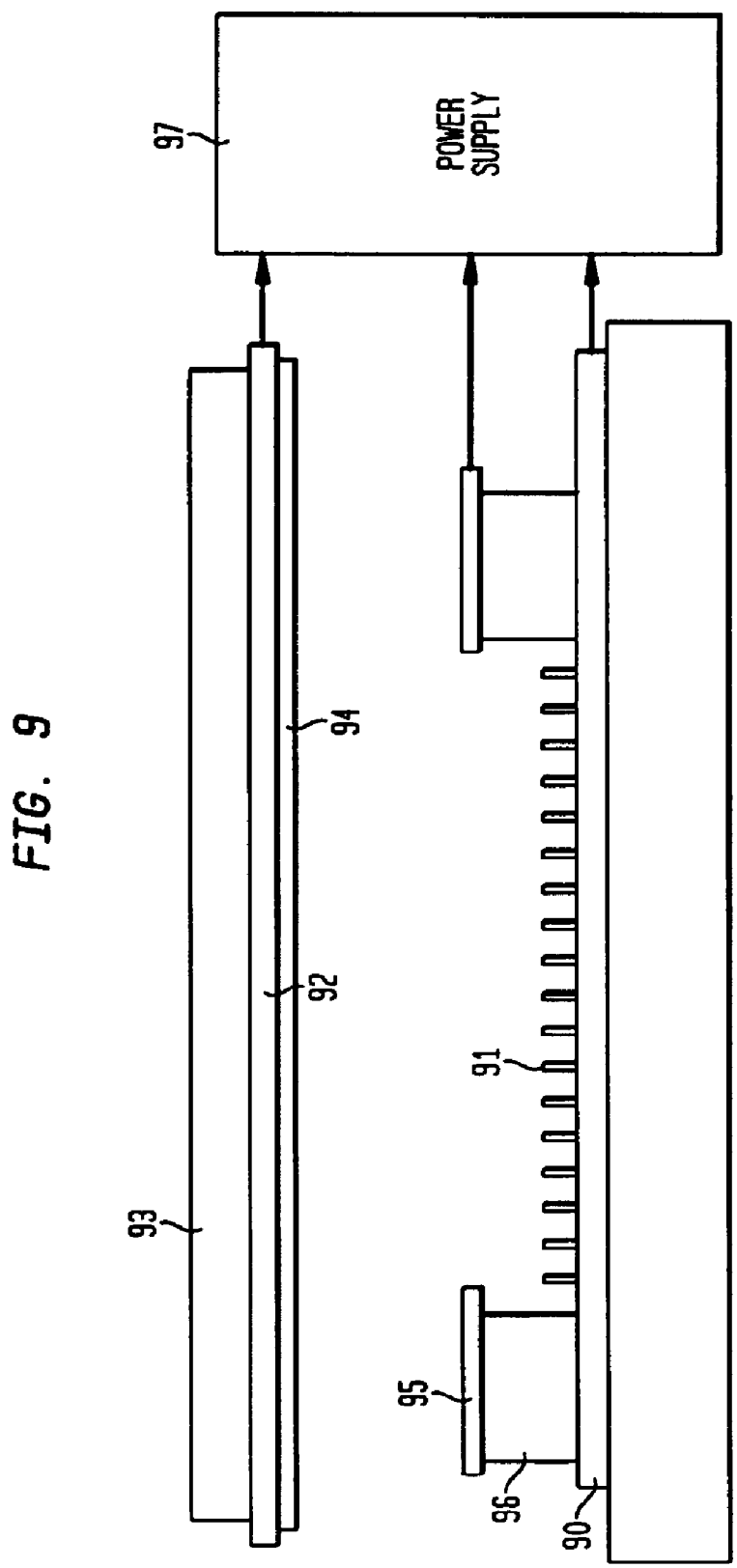
FIG. 9 is a schematic cross-sectional view of an improved field emission device.

The spaced-apart and aligned nanowire-based emitters described herein can also be utilized to make unique, flat-panel, field emission displays, such as schematically illustrated in FIG. 9. Here, the "flat-panel displays" is arbitrarily defined as meaning "thin displays" with a thickness of e.g., less than ~10 cm. Field emission displays can be constructed with either a diode design (i.e., cathode-anode configuration) or a triode design (i.e., cathode-grid-anode configuration). The use of grid electrode is preferred as the field emission becomes more efficient. Advantageously this electrode is a high density aperture gate structure place in proximity to the spaced-apart nanowire emitter cathode to excite emission. Such a high density gate aperture structure can be obtained e.g., by lithographic patterning.

For display applications, emitter material (the cold cathode) in each pixel of the display desirably consists of multiple emitters for the purpose, among others, of averaging out the emission characteristics and ensuring uniformity in display quality. Because of the nanoscopic nature of the nanowires such as carbon nanotubes, the emitter provides many emitting points, but because of field concentration desired, the density of nanotubes in the inventive device is restricted to less than $100/(\mu m)^2$. Since efficient electron emission at low applied voltage is typically achieved by the presence of accelerating gate electrode in close proximity (typically about 1 µm distance), it is useful to have multiple gate aperture over a given emitter area to maximally utilize the capability of multiple emitters. It is also desirable to have fine-scale, micron-sized structure with as many gate apertures as possible for maximum emission efficiency.

The exemplary field emission display in FIG. 9, comprises a substrate 90 which also serves as the conductive cathode, a plurality of spaced-apart and aligned nanotube emitters 91 attached on the conductive substrate, and an anode 92 disposed in spaced relation from the emitters within a vacuum seal. The transparent anode conductor formed on a transparent insulating substrate 93 (such as a glass) is provided with a phosphor layer 94 and mounted on support pillars (not shown). Between the cathode and the anode and closely spaced from the emitters is a perforated conductive gate layer 95. Conveniently, the gate 95 is spaced from the cathode 90 by a thin insulating layer 96.

The space between the anode and the emitter is sealed and evacuated, and voltage is applied by power supply 97. The field-emitted electrons from nanotube emitters 91 are accelerated by the gate electrode 95, and move toward the anode conductive layer 92 (typically transparent conductor such as indium-tin-oxide) coated on the anode substrate 93. Phosphor layer 94 is disposed between the electron emitters and the anode. As the accelerated electrons hit the phosphor, a display image is generated.

Plasma Displays

The spaced-apart and aligned nanowire structure described herein is also useful in improving the performance and reliability of flat panel plasma displays. Plasma displays utilize emissions from regions of low pressure gas plasma to provide electrodes within a visible display elements. A typical display cell comprises a pair of sealed cell containing a noble gas. When a sufficient voltage is applied between the electrodes, the gas ionizes, forms a plasma, and emits visible and ultraviolet light. Visible emissions from the plasma can be seen directly. Ultraviolet emissions can be used to excite visible light from phosphors. An addressable array of such display cells forms a plasma display panel. Typically display cells are fabricated in an array defined by two mating sets of orthogonal electrodes deposited on two respective glass substrates. The region between the substrates is filled with a noble gas, such as neon, and sealed.

Plasma displays have found widespread applications ranging in size from small numeric indicators to large graphics dismays. Plasma displays are strong contenders for future flat panel displays for home entertainment, workstation displays and HDTV displays. The advantage of using a low work function material to lower the operating voltage is described in U.S. Pat. No. 5,982,095 by Jin et al., "Plasma displays having electrodes of low-electron affinity materials", issued on Nov. 9, 1999, which is incorporated herein by reference. The nanowires according to the invention can provide improved plasma displays as the efficient electron emission from the spaced-apart and aligned nanowires allow the operation of plasma displays at reduced operating voltages, higher resolution, and enhanced robustness.

Figure 10:
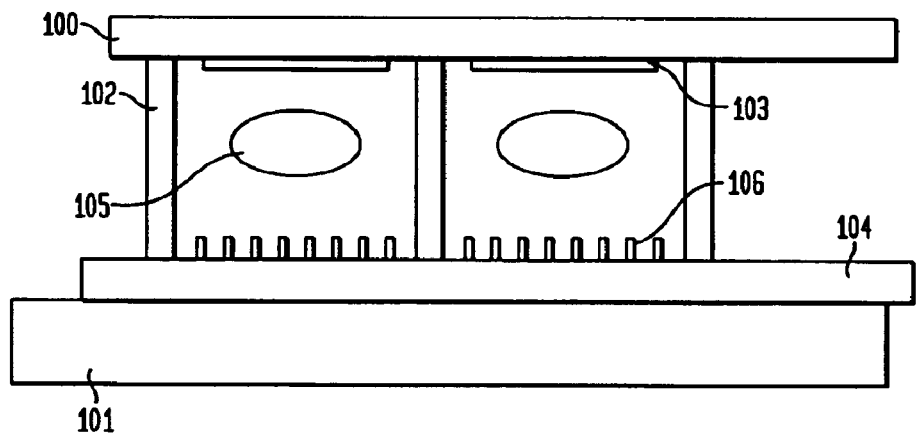
FIG. 10 is a schematic cross-sectional view of an improved plasma based flat panel display cell.

Referring to the drawings, FIG. 10 schematically illustrates an improved display cell in accordance with the invention. The cell comprises a pair of glass plates 100 and 101 separated by barrier ribs 102. One plate 100 includes a transparent anode 103. The other plate 101 includes a cathode 104. The plates 100, 101 are typically soda lime glass. The anode 103 is typically a metal mesh or an indium-tin-oxide (ITO) coating. The cathode 104 is either metal such as Ni, W and stainless steel or a conductive oxide. A noble gas such as neon, argon or xenon (or mixtures thereof) is filled in the space between the electrodes. The barrier ribs 102 are dielectric, and typically they separate plates 100, 101 by about 200 micrometers. In operation, a voltage from a power supply is applied across the electrodes. When the applied voltage is sufficiently high, a plasma 105 forms and emits visible and ultraviolet light. The presence of the inventive nanowire structure 106 will allow the plasma 105 to be generated at lower voltages because electron emission from the nanowire under electrical field or upon collision with ions, metastables and photons is much easier than with conventional materials. This facilitated emission greatly reduces the power consumption, simplifies the driver circuitry, and permits higher resolution.

Electron Source Array for Nano Fabrication

Nano fabrication technologies are crucial for construction of new nano devices and systems as well as for manufacturing of next generation, higher-density semiconductor devies. Conventional e-beam lithography with its single-line writing characteristics is inherently slow and costly. Projection e-beam lithography technology, which is sometimes called as SCALPEL, is disclosed in U.S. Pat. Nos. 5,701,014 and 5,079,112 by Berger, et al., and U.S. Pat. No. 5,532,496 by Gaston. The projection e-beam lithography may be able to handle ~1 cm$^2$ exposure with the exposure time of <1 second, but this is too slow for satisfactory throughput in manufacturing. The technique also requires the use of special stencil masks and still has a relatively poor resolution of several tens of nanometers. It would therefore be desirable if one can develop a new, two-dimensional type, e-beam nano lithography technique which can pattern a much wider area simultaneously with significantly higher throughput approaching those for current photolithography processes, and which can generate any programmed, high-resolution image without special masks. Such a new fabrication technology can provide electronics technology with finer feature sizes leading to higher device/circuit density and reduced size.

To accomplish such a two-dimensional e-beam lithography, a parallel beam writing has to take place simultaneously at many different locations on the surface of the object to be nano patterned. In theory, a two-dimensional, x-y addressable array of electron field emission sources (for example, as in the Spindt tip cold cathode array described in an article by C. A. Spindt, C. E. Holland, A. Rosengreen, and I. Brodie, "Field emitter array development for high frequency operation," *J. Vac. Sci. Technol. B*, vol. 11, pp. 468–473, 1993, or nanotube field emission display cathodes described by W. B. Choi, et al., "Carbon-Nanotube Based Field-Emission Displays for Large Area and Color Applications", Journal of Information Display, Vol. 1, No. 1, p. 59, December 2000 may be used to achieve simultaneous e-beam writing. However, it would be impractical to try to make the size scale of each cold cathode cell structure to be on the order of ~10 nanometers, the resolution of the current e-beam lithography. Even if such a nanoscale cathode structure can be fabricated, the number of cathode cells and associated lead wires required for x-y addressing would be astronomical. To carry out two-dimensional e-beam lithography on a 12 inch diameter wafer, for example, it would take ~$10^{14}$ cathodes and wire connections.

In the present invention, in order to bring up the cathode cell size to a more practical range while maintaining a very fine resolution (e.g., ~10 nm scale) in the two-dimensional e-beam writing, MEMS technology is incorporated. By combining the MEMS and the nano technology, such a desired goal of creating a new and novel two-dimensional e-beam lithography technology can be accomplished. The inventive lithography apparatus consists of subdivided MEMS cells. A movable MEMS component in each MEMS cell will be electrostatically or magnetically actuated to tilt/rotate three-dimensionally so that the electron trajectory from a nano field emitter attached onto it (e.g., nanowire or nanotube cold cathode) can be scanned over the entire cell area, e.g., 10 micrometer diameter of square area. The device contains an array of MEMS cells, each containing a movable and scannable component with a single electron field emitter. The object to be e-beam lithographed, such as a thin coating of resist material, e.g., PMMA (poly methylmethacrylate) is, after exposure to the e-beam irradiation, chemically etch processed to develop a nano-scale patterned structure. Alternatively, instead of using the resist material, the scanning e-beams may be allowed to directly bombard thin metal or ceramic films so that melting and ablation removal (evaporation) of the material occurs to generate a trench or hole type nano patterned structure.

Figure 11:
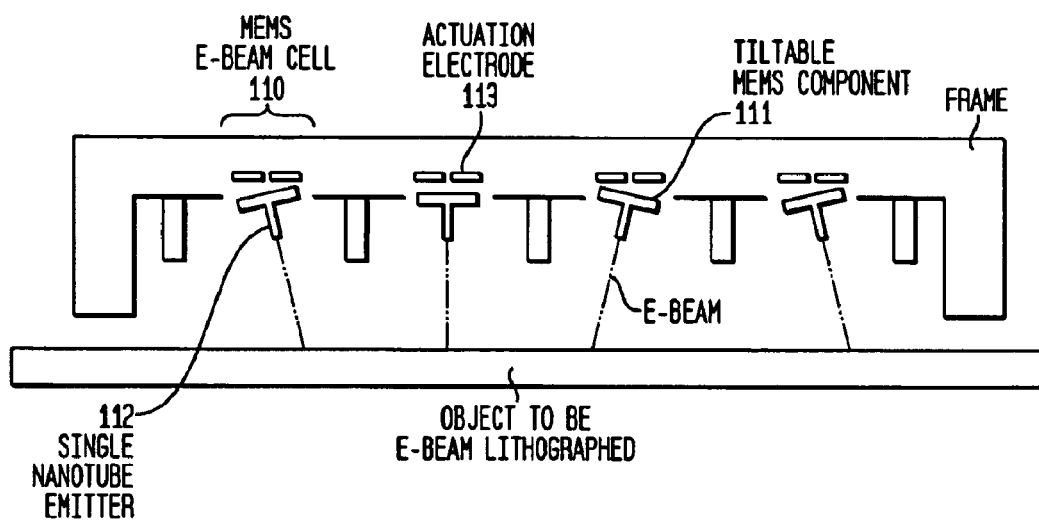
FIG. 11 schematically shows a novel two dimensional array of MEMS steerable electron sources comprising the periodically spaced-apart carbon nanotubes.

Referring to FIG. 11 which shows an exemplary two-dimensional e-beam lithography device comprises an array of MEMS cells 110, and each of the MEMS cells contains a movable disk of any shape (circular, square, triangular, etc.). The tilting of movable disk 111 in each cell and hence the trajectory of field emitted electrons from the nano emitter 112 attached on the the movable disk is controlled to any desired angle by applying a varying intensity of electric fields to least 3 electrodes 113 located above the disk. Such a tilting technology for MEMS movable component has been established in recent years. See U.S. Pat. No. 6,201,631 by Greywall (Mar. 13, 2001), U.S. Pat. No. 6,028,689 by Michalicek et al. (Feb. 22, 2000), and U.S. Pat. No. 5,629,790 by Neukennans et al. (Mar. 13, 1997). The MEMS structure illustrated in FIG. 11 can be fabricated by using either surface micro-machining such as MUMPS (Multi User MEMS Processing System) process, bulk micro-machining such as employing SOI (silicon-on-insulator) based process, or LIGA process (based on x-ray lithography and electrodeposition). Such MEMS fabrication processes are described in detail in the literature, for example, see the book entitled "Fundamentals of Microfabrication" by Marc Madou, CRC Press, New York 1997, and the book entitled "Micromachined Transducers—Source Book" by Gregory T. A. Kovacs, McGraw Hill, New York 1998. The MEMS structure can be made of a number of alternative materials including poly-silicon, single crystal silicon, silicon carbide, diamond or metal.

On each movable disk 111, a single electron field emitter 112 (or optionally a few redundant spare nanowires) is vertically placed as a source of scanning e-beam. The field emitter is preferably made of carbon nanotube, but the use of other types of nanowires based on non-carbon materials, a material with sharp tips such as patterned silicon tips, or a combination of these materials is not excluded. Carbon nanotubes grown on silicon pyramid tips (such as described in U.S. Pat. No. 6,401,526 by Dai et al. (Jun. 11, 2002) may also be used as emitters for this invention. To maintain the high resolution with a minimal waste of real estate space on the device surface, the spaced-apart nanowires for the 2-dimensional e-beam lithography device are preferably grown directly on the surface of the moving disk. It is known that a single nanotube is capable of providing a large emission current density of as high as ~$10^8$ A/cm$^2$.

An exemplary tiltable disk structure suitable for the inventive device can be either a spring-configuration or a double-gimbal configuration. Other types of tilt/rotate designs such as using torsional bars can also be used. The movable disk, and hence the pointing direction of the nanotube emitter attached on it, can be tilted toward any direction by independent control of the electrostatic potentials applied between the movable disk and each of the electrodes. Alternatively, instead of electrostatic actuation to tilt the movable disk, a magnetic actuation can also be used by adding (or thin film depositing) a magnetic layer material on the movable disks. Instead of applying a potential (voltage) onto the electrodes, an electrical current will be applied to solenoids or thin/thick film coils to induce magnetic attraction or repulsion force on the movable component. Other types of MEMS actuation may also be utilized, for example, piezoelectric or thermal actuation.

Figure 12A:
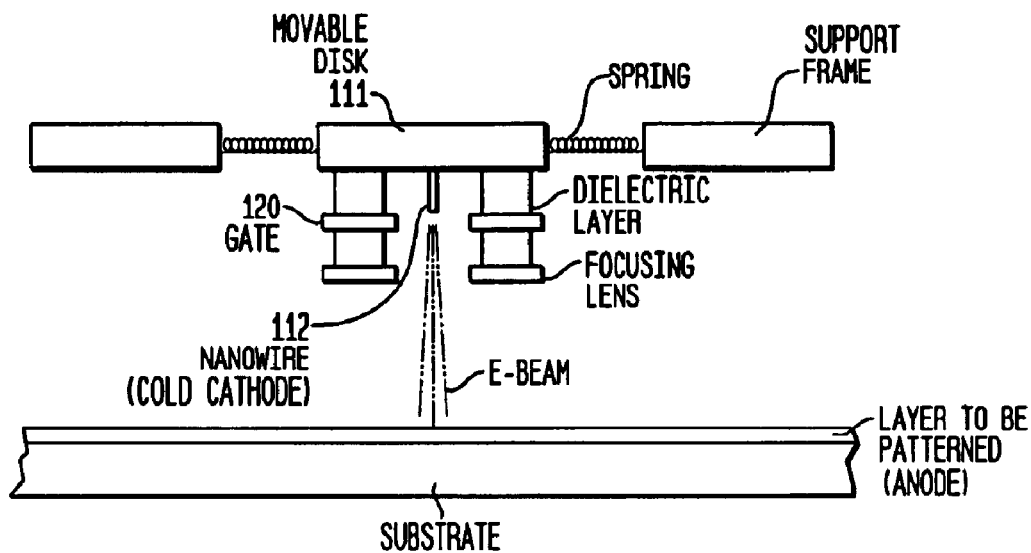
FIG. 12 illustrates electron beam focusing electrodes for the steerable electron source device.
Figure 12B:
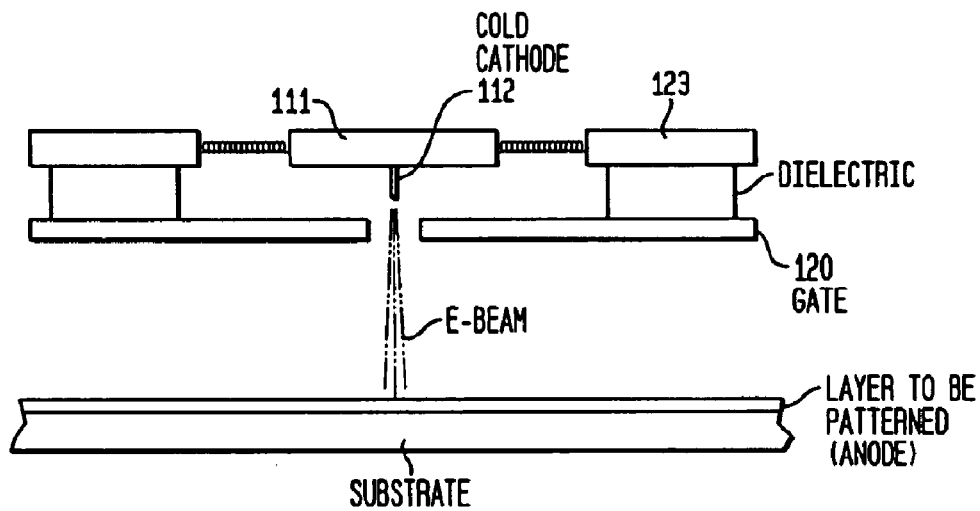

While a simple diode structure consisting of a cathode (e.g., the nanotube field emitter) and an anode (the object to be e-beam lithographed) can be adapted, a triode structure provides an easier control of electron emission by the presence of gate electrode near the cathode. FIGS. 12(a) and 12(b) show push triode structures. A gate 120 placed near the tip of carbon nanotubes 112 for ease of extracting the electrons, may also be combined with additional electrode layers stacked to serve as optical lenses for e-beam focusing. Either electrostatic or magnetic focusing may be utilized. In FIG. 12(a), the gate and the focusing lens are fabricated directly on each of the movable disk 111. An alternative structure is to attach the gate 120 on the support frame 123 instead of on the movable disk 111. The latter would be useful if the angle range of the intended scanning is relatively small, e.g., less than ~10 degrees away from the vertical center line.

Figure 13:
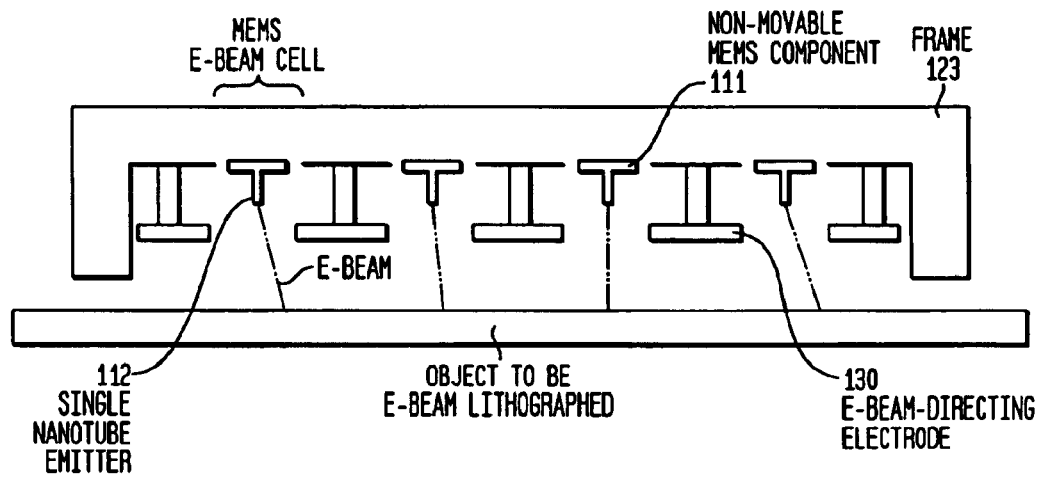
FIG. 13 shows a two dimensional array of electrostatically steerable electron sources comprising the periodically spaced-apart carbon nanotubes.
Figure 14:
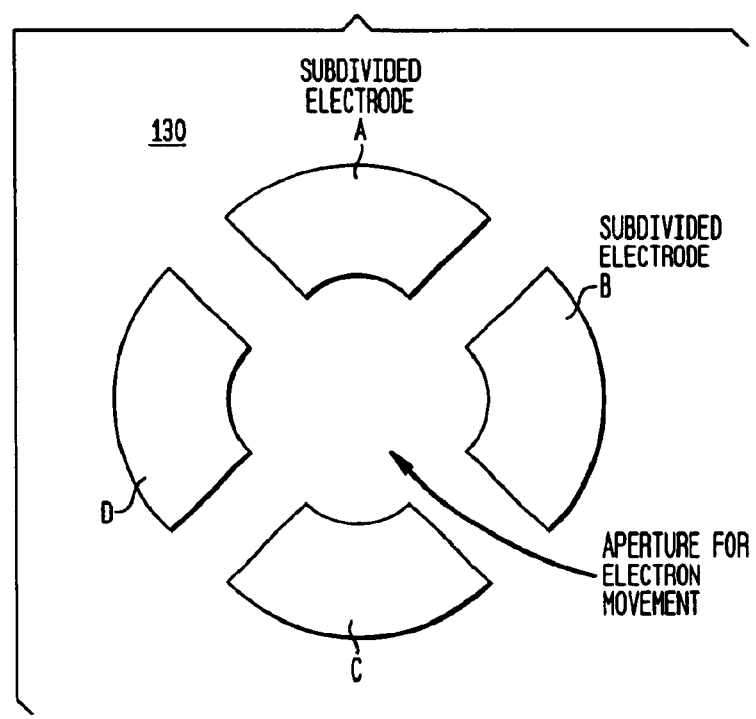
FIG. 14 illustrates a configuration of control electrodes for steering of electron beam in field emission devices.

A different approach of scanning the e-beam using electronic controls only, without any moving parts, can also be employed for the inventive 2-dimensional lithography device, as illustrated in FIG. 13. In this alternative embodiment, the gate or a focusing lens 130 can be used as a means of altering the beam direction. The emitter support 112 can be stationary. By subdividing the gate or focusing lens electrode 130, e.g., as independently controllable segments A, B, C, D as illustrated in FIG. 14, and applying asymmetric potentials among the sub-electrodes, the e-beam can be made to project toward any selected directions. The electrons tend to move toward the electrode segment with higher applied voltage. The advantage in this approach is that the electrostatically actuated MEMS moving components and long-term reliability complications associated with the presence of moving parts can be eliminated altogether.

As a field emitter, the use of a single (or at most 5) nanotube for each cell is preferred to a multiplicity of nanotubes as the problem of beam spread and perpendicular momentum is minimized. A multiple nanotube per unit cell configuration, while easier to fabricate than the single nanotube configuration, is likely to complicate the electron optics design because the increased spread in energy and perpendicular momentum would make it more difficult to focus the e-beam. The spaced-apart and periodically arranged inventive nanowire configuration fits well with the periodically arranged nature of the MEMS cell structure.

The desired size of each MEMS cell in the inventive two-dimensional electron source array is in the range of 1–1000 micrometer in square or circular dimension. The desired density of MEMS cells can be determined based on the needs for high throughput weighed against the complexity of fabricating many small cells. By virtue of simultaneous writing from many electron emitters in the inventive two-dimensional e-beam lithography device, without even requiring special masks (such as those used for projection e-beam lithography), a high throughput in lithography process is possible. The inventive technique can generate any image on the resist layer material via independent control of the MEMS cells.

Instead of using a resist material, the inventive two-dimensional e-beam lithography device can also be used as a direct-writing tool on metal, ceramic or polymer substrate. Because of the two-dimensional, simultaneous write-capability at many beam sites, the speed of information recording by this technique can be very high. With the e-beam energy sufficient to ablate the material, a permanent hole or groove pattern can be recorded so as to create ultra-high-density CD ROM (read-only-memory) disks for storage of data or information. The desired dimension of such recorded memory bit size is in the range of about 10 nm–100 nm, preferably less than 50 nm, even more preferentially less than 20 nm. The reading of the stored information bits so produced may be read with special light beam such as NSOM (Near-Field Scanning Microscopy) or even with the electron beam itself.

Figure 15:
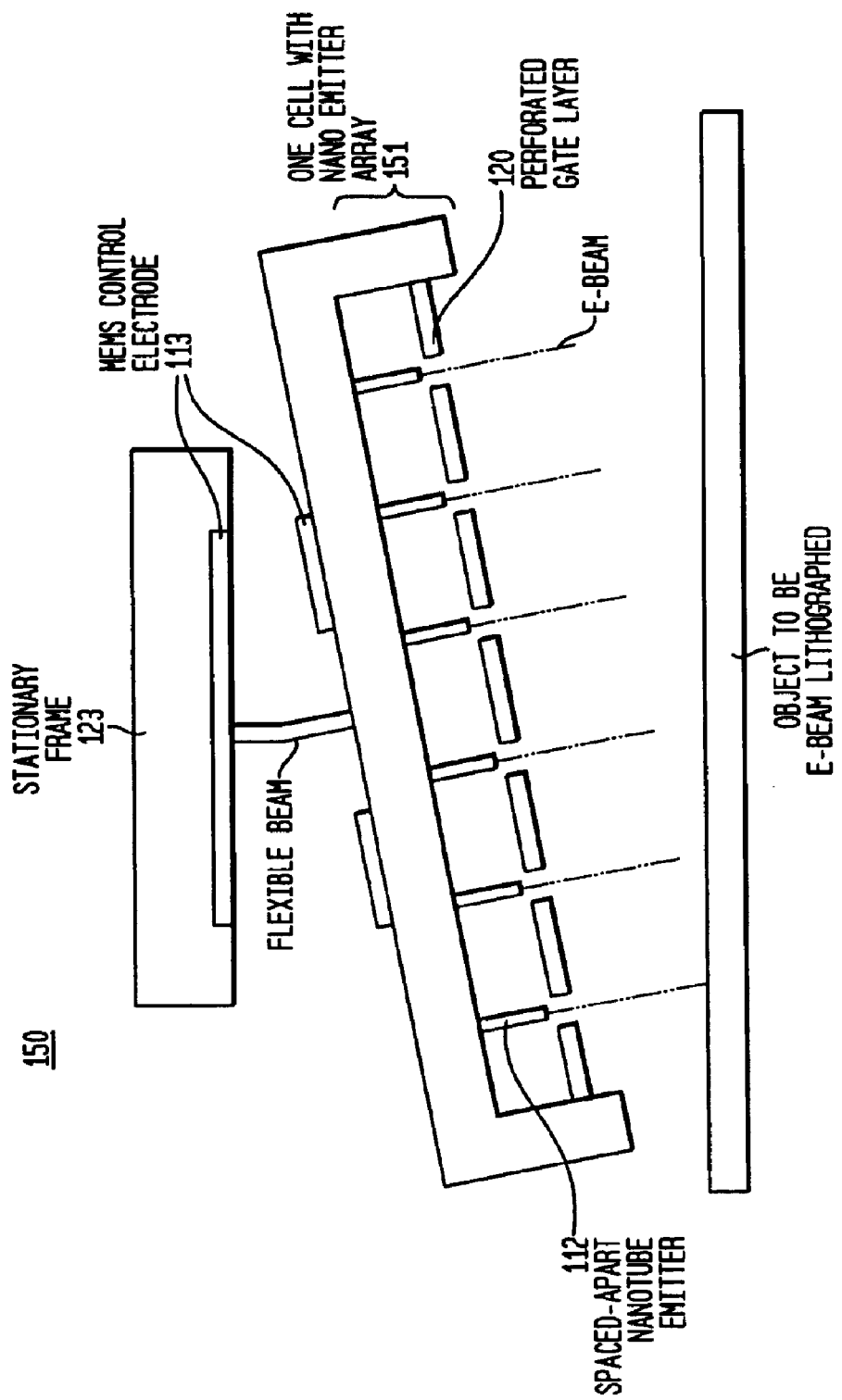
FIG. 15 shows a MEMS steerable electron source comprising a group of periodically spaced-apart nanowires.

FIG. 15 schematically illustrates another e-beam source array 150 comprising the spaced-apart and aligned nanowires 112 scanned by a MEMS cell 151 as an array e-beam sources 112. Such a device configuration is convenient if a broader e-beam rather than a single line, focused e-beam is desired, e.g., for localized projection e-beam lithography.

Ultra High Density Displays

Figure 16A:
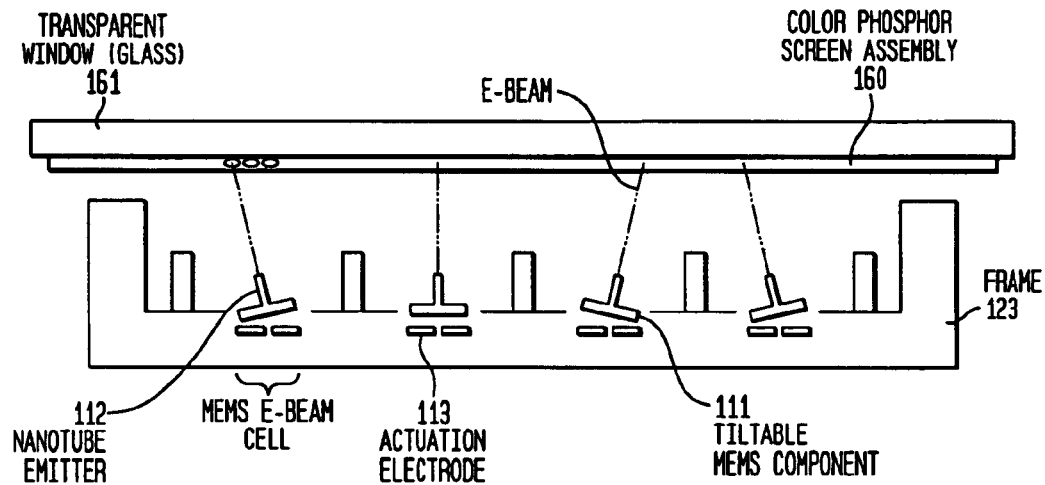
FIGS. 16(a) and (b) schematically illustrate high-resolution, MEMS-based field emission displays.
Figure 16B:
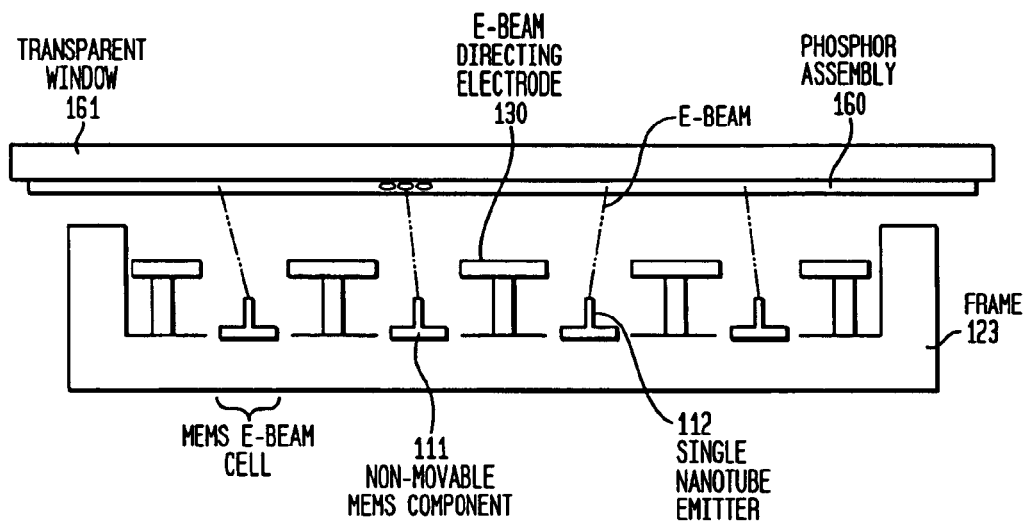

The inventive technique can also be utilized for design and construction of high-resolution, flat panel displays 160 such as illustrated in FIGS. 16(a) and 16(b). A phosphor screen assembly 160 with red-green-blue colors and a transparent glass window 161 are added in front of the electron beam. The diameter of an e-beam arriving at the phosphor screen 160 will be of the order of 10–500 nm depending on the distance, a super-sharp, super-high-density-pixel display image with a resolution of better than 1 micrometer, preferably better than 500 nm, even more preferably better than 100 nm can be obtained. The resolution requirement for typical displays such as TV screens and computer monitors is relatively modest as human eye can not handle an image resolution finer than ~100 micrometers. For display devices that human will see at a much closer distance, for example, head-mounted displays or wearable personal computing devices, a much higher resolution on the order of ~3 micrometers is required. These headmounted displays allow the use of one's hands freely, and are thus useful for a number of unique applications such as a wearable computer that can be operated while walking, a headmounted gear for a soldier detecting land mines, for a person going through a virtual reality traveling in a car, or for a surgeon undertaking a remote operation through telecom-connected virtual reality devices.

The fabrication of display devices having ~3 micrometer display pixel cell dimension, as compared to the present day display cell size of ~100 micrometers, will be significantly more complex and expensive. In this invention, such a high resolution display is made possible by a novel approach of MEMS based e-beam steering or electrostatically controlled e-beam steering, without having to substantially reduce the cell size.

Two Dimensional X-Ray Source

Figure 17:
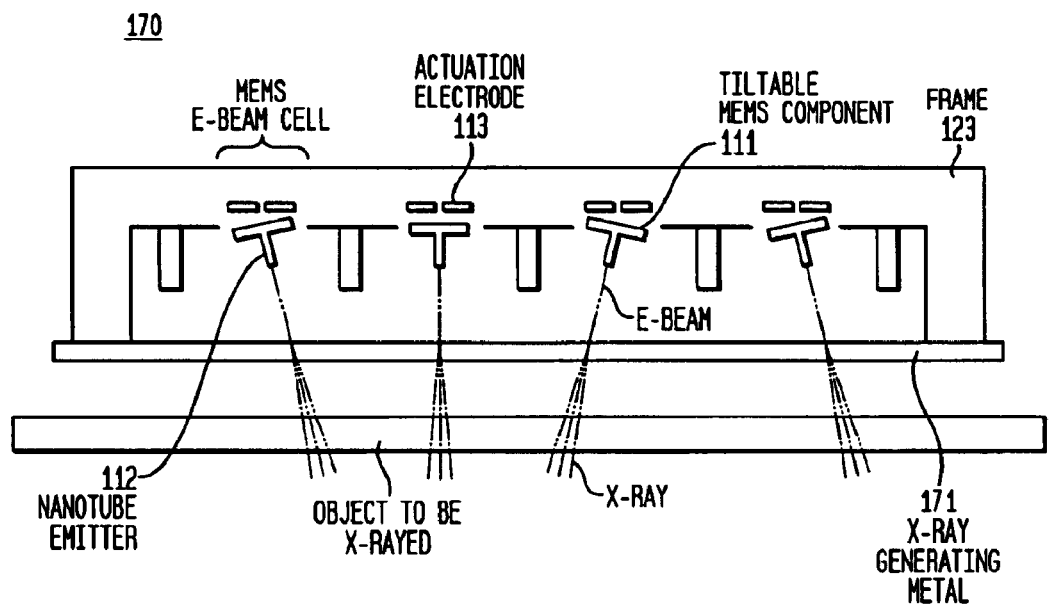
FIG. 17 shows two-dimensional x-ray source.

As illustrated in FIG. 17 the inventive two-dimensional MEMS e-beam source array comprising spaced-apart nanowires can also be utilized as a high-resolution, programmable, two-dimensional x-ray source 170 for applications such as an x-ray lithography tool by incorporating x-ray generating metal film components 171 in front of the emitted electrons, or as a portable, flat-panel, x-ray source for on-site imaging of wounded person by ambulance personnel or battle field medical personnel. The electron bombardment of the metal layer or metal structure from each nanotube emitter 112 generates an x-ray beam with a characteristic wavelength.

It is understood that the above-described embodiments are illustrative of only a few of the many possible specific embodiments which can represent applications of the invention. It can be seen that the invention includes a method of making a plurality of spaced-apart nanostructures comprising the steps of providing a shadow mask having a plurality of spaced-apart openings, adding material around the periphery of the openings to reduce the size of the openings to nanoscale dimensions less than a micron, positioning the shadow mask overlying a substrate and introducing material through the nanoscale openings into contact with unmasked portions of the substrate. Numerous and varied other arrangements can be made by those skilled in the art without departing from the spirit and scope of the invention.

What is claimed is:

1. A method of making a plurality of spaced apart nanostructures comprising the steps of:
   providing a shadow mask having a plurality of spaced apart openings,
   adding material around the periphery of the openings to reduce the size of the openings to nanoscale dimensions less than a micron;
   positioning the shadow mask overlying a substrate; and
   introducing material through the nanoscale openings into contact with unmasked portions of the substrate.

2. The method of claim 1 wherein sufficient material is added around the openings to reduce the effective diameter of the openings to one-third the effective diameter before the material was added or less.

3. The method of claim 1 wherein sufficient material is added around the openings to reduce the effective diameter of the openings to one-fifth the effective diameter before the material was added or less.

4. The method of claim 1 wherein sufficient material is added around the openings to reduce the effective diameter of the openings to 200 nanometers or less.

5. The method of claim 1 wherein sufficient material is added around the openings to reduce the effective diameter of the openings to 100 nanometers or less.

6. The method of claim 1 wherein sufficient material is added around the openings to reduce the effective diameter of the openings to 30 nanometers or less.

7. The method of claim 1 wherein the material introduced through the nanoscale openings forms a plurality of spaced-apart deposited regions having effective diameters of 200 nanometers or less.

8. The method of claim 1 wherein the material introduced through the nanoscale openings forms a plurality of spaced-apart deposited regions having effective diameters of 100 nanometers or less.

9. The method of claim 1 wherein the material introduced through the nanoscale openings forms a plurality of spaced-apart deposited regions having effective diameters of 30 nanometers or less.

10. The method of claim 1 wherein the material introduced through the nanoscale openings comprises a metal.

11. The method of claim 10 wherein the metal is a metal selected from the group consisting of Ni, Cu, Mo.

12. The method of claim 1 wherein the material introduced through the nanoscale openings comprises a catalyst for the growth of solid or hollow nanowires.

13. The method of claim 1 wherein the spaced apart openings are spaced apart in a two dimensional array.

14. The method of claim 13 wherein the openings are spaced apart in a periodic two dimensional array.

15. The method of claim 1 wherein the material introduced through the openings comprises a magnetic material.

16. The method of claim 1 wherein the material introduces through the openings comprises a gaseous material comprising at least one gaseous compound having at least one atom of catalyst material in the molecular formula of the compound.

17. The method of claim 1 further comprising the step of growing solid or hollow nanowires on the unmasked regions of the substrate corresponding to the openings in the mask.

18. The method of claim 1 wherein material is added around the periphery of the openings by physical vapor deposition.

19. The method of claim 1 wherein material is added around the periphery of the openings by chemical vapor deposition.

20. The method of claim 1 wherein material is added around the periphery of the openings by electrochemical deposition.

21. The method of claim 1 wherein the material is added around the periphery of the openings by oblique angle incident deposition at an angle of 5 to 45° from vertical.

22. The method of claim 1 wherein:
   the shadow mask comprises a ferromagnetic material; and
   the mask is magnetically positioned overlying the substrate.

23. The method of claim 1 wherein the step of introducing material through the nanoscale openings clogs the openings; and
   further comprising the step of etching or cleaning the openings of the clogging material.

24. A mask for masking the deposition of an array of nanoscale structures comprising:
   a coarse mask having a plurality of openings therethrough in an array, the spacing between adjacent openings about two micrometers or less; and
   added material in the openings to reduce the effective diameter of the openings to 200 nanometers or less.

25. The mask of claim 24 wherein the added material in the openings reduces the effective diameter of the openings to 100 nanometers or less.

* * * * *